United States Patent [19]

Giroux

[11] Patent Number: 4,817,562
[45] Date of Patent: Apr. 4, 1989

[54] VEHICULAR PET RESTRAINT

[76] Inventor: Martha K. Giroux, R.R. 2, Rte. 207, Box 9, Lebanon, Conn. 06249

[21] Appl. No.: 327

[22] Filed: Dec. 29, 1986

[51] Int. Cl.⁴ ............................................. A01K 29/00
[52] U.S. Cl. ......................................................... 119/96
[58] Field of Search ................... 119/96, 106; 24/298, 24/299, 300, 301, 302; 297/468, 485

[56] References Cited

U.S. PATENT DOCUMENTS

| 487,041 | 11/1892 | Ziegler | 24/300 |
| 791,227 | 5/1905 | Stringham et al. | 24/300 |
| 1,832,407 | 11/1931 | Mix | 24/298 |
| 3,170,206 | 2/1965 | Triplett | 24/298 |
| 3,310,034 | 3/1967 | Dishart | 119/106 |
| 3,936,092 | 2/1976 | Dietz | 297/485 |
| 4,026,245 | 5/1977 | Arthur | 119/96 |
| 4,324,204 | 4/1982 | Friedman | 119/96 |
| 4,512,286 | 4/1985 | Rux | 119/96 |
| 4,537,154 | 8/1985 | Kay | 119/96 |

FOREIGN PATENT DOCUMENTS

| 65509 | 11/1982 | European Pat. Off. | 119/96 |
| 1581108 | 2/1970 | Fed. Rep. of Germany | 297/468 |

Primary Examiner—John J. Wilson
Attorney, Agent, or Firm—Richard A. Craig

[57] ABSTRACT

A vehicular pet restraint includes a harness portion having straps for releasably engaging a pet's body for restraining the pet, and an attaching portion having a left side attaching strap provided with a member for releasable interlocking engagement with a mating member on a left strap of a seat belt that is already installed in a vehicle and a right side attaching strap provided with a member for releasable interlocking engagement with a mating member on a right strap of the seat belt. Thus, the vehicular pet restraint becomes, in effect, a link between the left and right straps of the seat belt.

6 Claims, 1 Drawing Sheet

VEHICULAR PET RESTRAINT

BACKGROUND OF THE INVENTION

This invention relates to pet safety devices and more particularly to vehicular pet restraints to keep pets from being tossed around in the event of an accident, much the same as seat belts protect human beings while riding in cars or trucks.

The reader may be interested in the following prior U.S. Pat. Nos. that were found in a search on the subject matter hereof:

Dishart discloses a dog harness for use in protecting the dog from injury while riding in an automobile. A pair of elongated flexible flat seat straps are provided for fastening the harness to a pair of eye-bolts that are anchored in the back of the automobile seat. The seat straps do not appear to be part of the original equipment of the automobile but must be specially installed.

Arthur discloses a restraining device for holding a child to a lap seat belt in a car. Straps have loops through which an ordinary lap seat belt is passed, to fasten the device to the lap seat belt. The two halves of the lap seat belt are connected to each other.

Friedman discloses a safety harness for securing a dog to the seat of an automobile. Two special belts are secured about the back of the seat and to the harness.

Rux discloses a pet seat for automobiles, while Kay discloses an animal or child harness, through portions of which an original equipment seat belt passes.

It is an important object of the invention to provide a vehicular pet restraint that is an improvement over the prior art as typified by the above-mentioned patents.

A further important object is to provide a harness-type vehicular pet restraint that can be installed in and removed from a vehicle already equipped with standard seat belts, without modification.

A still further object is to provide a harness-type vehicular pet restraint having straps that are releasably interlockable with original equipment seat belts.

The foregoing and other objects and advantages will become apparent hereinafter.

SUMMARY OF THE INVENTION

A vehicular pet restraint according to the invention comprises a harness portion having straps for releasably engaging a pet's body for restraining the pet, and an attaching portion having a left side attaching strap provided with a member for releasable interlocking engagement with a mating member on a left strap of a seat belt that is already installed in a vehicle and a right side attaching strap provided with a member for releasable interlocking engagement with a mating member on a right strap of the seat belt. Thus, the vehicular pet restraint becomes, in effect, a link between the left and right straps of the seat belt.

DESCRIPTION OF THE INVENTION

Figure 1:
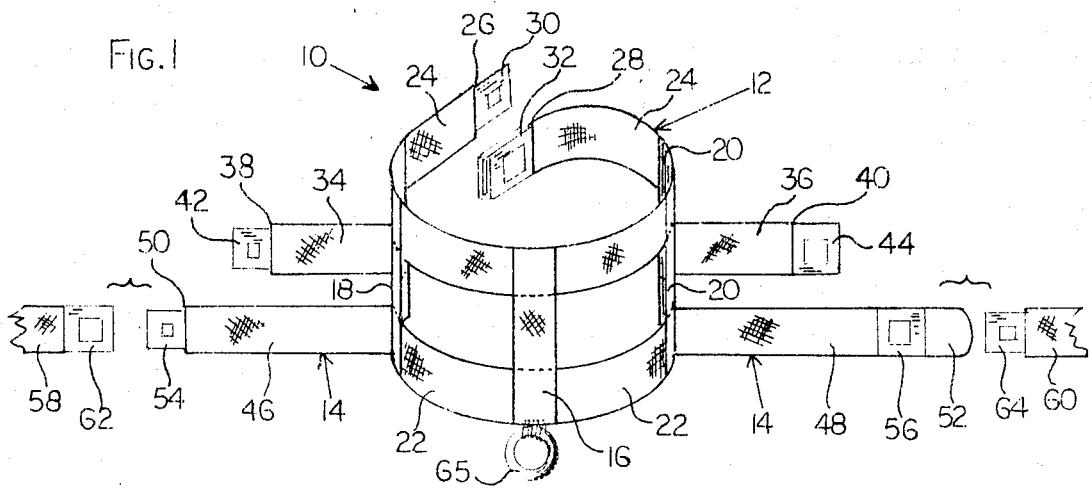
FIG. 1 is a top view of a preferred vehicular pet restraint embodying the invention, also showing fragmentarily first and second portions of a seat belt.

The invention will be described at first with reference to FIG. 1 which shows a preferred vehicular pet restraint, indicated generally at 10, that comprises a harness portion 12 and an attaching portion 14.

Harness portion 12 has straps for engaging the body of a pet (not shown), these straps including a longitudinal central strap 16 of predetermined length for longitudinal engagement along the pet's back, a left side strap 18 for longitudinal engagement along the left side of the pet's rib cage, and a right side strap 20 for longitudinal engagement along the right side of the pet's rib cage. Straps 18 and 20 are seen in edge view in FIG. 1 and are substantially the same length as strap 16. Harness portion 12 also has a rear strap 22 and chest strap means comprising a single chest strap 24. One end of rear strap 22 is affixed to left side strap 18 at its rear end and the other end of rear strap 22 is affixed to right side strap 20 at its rear end. At its longitudinal center, rear strap 22 is affixed to the rear end of strap 16. Front strap 24 is affixed to the front ends of straps 18 and 20 and at its approximate longitudinal center to the front end of strap 16, such that the length of strap 24 between straps 16 and 18 is substantially the same as the length of strap 22 between straps 16 and 18 and the length of strap 24 between straps 16 and 20 is substantially the same as the length of strap 22 between straps 16 and 20. Strap 24 extends beyond strap 18 to a free end 26 and beyond strap 20 to a free end 28. Free ends 26 and 28 are provided with complementary female and male latching members 30 and 32, respectively, whereby strap 24 can pass around the pet's chest and be releasably fastened together in front of the pet's front legs.

Harness portion 12 further has belly strap means comprising a left belly strap 34 and a right belly strap 36. Left strap 34 is affixed to left side strap 18 just aft of strap 24, while right belly strap 36 is affixed to right side strap 20 just aft of strap 24. Left belly strap 34 is of a predetermined length and has a free end 38. Right belly strap 36 is of a predetermined length substantially the same as the length of left belly strap 34 and has a free end 40. Free ends 38 and 40 are provided with complementary female and male latching members 42 and 44, respectively, whereby straps 34 and 36 can pass around the pet's belly and be releasably fastened together behind the pet's front legs.

It is to be noted that chest strap 24 and belly straps 34 and 36 fasten together in the frontal area of the pet, so that they may be fastened and released easily and quickly.

Attaching portion 14 comprises attaching strap means including a left attaching strap 46 and a right attaching strap 48. Left strap 46 is affixed to left side strap 18 at its rear end, at the same location where side strap 18 is affixed to rear strap 22, while right strap 48 is affixed to right side strap 20 at its rear end, at the same location where side strap 20 is affixed to rear strap 22. Left attaching strap 46 is of a predetermined length and has a free end 50. Right attaching strap 48 is of a predetermined length substantially the same as the length of left attaching strap 46 and has a free end 52. Straps 46 and 48 are provided with female and male latching members 54 and 56, respectively. FIG. 1 shows right attaching strap 48 passing through male latching member 56 to free end 52, whereby latching member 56 can be positioned at varying distances from free end 52, so that the effective length of strap 48 is adjustable.

FIG. 1 also shows fragmentarily left and right straps 58 and 60, respectively, of a seat belt that is already installed in a vehicle, on the rear seat thereof. Straps 58 and 60 have male and female latching members 62 and 64, respectively, for normal releasable interlocking engagement with each other for holding a person. According to the invention, attaching portion 14 is attached to the pre-existing seat belt by releasably engaging female member 54 of strap 46 with male member 62 of strap 58 and by releasably engaging male member 56 of strap 48 with female member 64 of strap 60, so that vehicular pet restraint 10 becomes, in effect, a link between seat belt straps 58 and 60.

Straps 46 and 48 may be releasably attached to left side strap 18 and right side strap 20, respectively, by conventional means (not shown) and harness portion 12 may be provided with a ring 65, whereby, if desired, a leash (not shown) may be attached to harness portion 12 which may be detached from straps 46 and 48 and harness portion 12 may be used as a walking harness.

Figure 2:
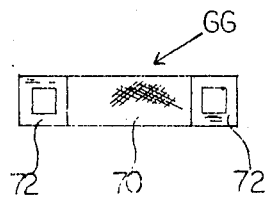
FIG. 2 is a plan view of a first adapter that may be used with the pet restraint of FIG. 1.
Figure 3:
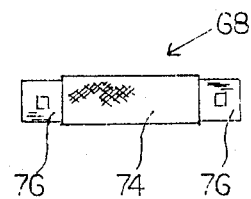
FIG. 3 is a plan view of a second adapter that may be used with the pet restraint of FIG. 1.

Depending on whether the pet is to be stationed on the left side or the right side of the rear seat of the vehicle, it may be necessary to provide left attaching strap 46 with a male latching member and right attaching strap 48 with a female latching member. In other words, left seat belt strap 58 may have a female latching member and right seat belt strap 60 may have a male latching member. FIGS. 2 and 3 show, respectively, first and second adapters 66 and 68 that may be used to effect this reversal. Adapter 66 comprises a short strap 70 with a male latching member 72 on each end, and adapter 68 comprises a short strap 74 with a female member 76 on each end. One male member 72 of adapter 66 can be releasably interengaged with female member 54 of left attaching strap 46 and one female member 76 of adapter 68 can be releasably interengaged with male member 56 of right attaching strap 48. Thus, the other male member 72 of adapter 66 can be releasably interengaged with a female member on left seat belt strap 58, and the other female member 76 of adapter 68 can be releasably interengaged with a male member on right seat belt strap 60.

It is evident that the invention attains the stated objects and advantages and others.

The disclosed details are exemplary only and are not to be taken as limitations on the invention except as the details may be included in the appended claims.

What is claimed is:

1. A vehicular pet restraint comprising a harness portion for engaging a pet's body for restraining the pet, and an attaching portion having a left side attaching strap affixed to said harness portion and provided with a left latching member for releasable interlocking engagement with a left mating latching member on a left strap of a seat belt already installed in a vehicle and a right side attaching strap affixed to said harness portion and provided with a right latching member for releasable interlocking engagement with a right mating latching member on a right strap of the seat belt, wherein one of said left latching member of said restraint and said right latching member of said restraint is a female latching member and the other one of said left latching member of said restraint and said right latching member of said restraint is a male latching member.

2. A pet restraint according to claim 1 wherein said harness portion is provided with a leash holding ring and said attaching straps are releasably affixed to said harness portion, whereby said harness portion is usable as a walking harness.

3. A pet restraint according to claim 1 wherein said left latching member of said restraint is a female latching member and said right latching member of said restraint is a male latching member.

4. A pet restraint according to claim 1 wherein said harness portion comprises a longitudinal central strap for engagement along a pet's back, a left side strap for engagement along the left side of the pet's rib cage, a right side strap for engagement along the right side of the pet's rib cage, a rear strap affixed to said central strap and to said left side strap and to said right side strap, a front strap affixed to said central strap and to said left side strap and to said right side strap and extending beyond said left side strap and said right side strap to free ends provided with mating latching members for releasable interlocking engagement with said front strap passing around the pet's chest in front of the pet's front legs, and belly strap means including a left belly strap affixed to said left side strap at a location aft of said front strap and a right belly strap affixed to said right side strap at a location aft of said front strap, said left and right belly straps provided with mating latching members for releasable interlocking engagement in front of the pet's belly with said belly straps passing behind the pet's front legs.

5. A pet restraint according to claim 4 wherein said left side attaching strap of said attaching portion is affixed to said harness portion at the location where said left side strap of said harness portion is affixed to said rear strap and said right side attaching strap of said attaching portion is affixed to said harness portion at the location where said right side strap of said harness portion is affixed to said rear strap.

6. The combination of a pet restraint according to claim 1 and first and second adapters, said first adapter comprising a strap having two ends and a male latching member on each said end of said strap of said first adapter and said second adapter comprising a strap having two ends and a female latching member on each said end of said strap of said second adapter, either said male latching member of said first adapter being capable of releasable interlocking engagement with said female latching member of said pet restraint and either said female latching members of said second adapter being capable of releasable interlocking engagement with said male latching member of said pet restraint.

* * * * *